United States Patent [19]

Yamamoto et al.

[11] Patent Number: 5,448,482
[45] Date of Patent: Sep. 5, 1995

[54] VEHICLE STEERING SYSTEM

[75] Inventors: Yorihisa Yamamoto; Yutaka Nishi; Takashi Nishimori; Hiroyuki Tokunaga, all of Saitama, Japan

[73] Assignee: Honda Giken Kogyo Kabushiki Kaisha, Tokyo, Japan

[21] Appl. No.: 218,134

[22] Filed: Mar. 25, 1994

[30] Foreign Application Priority Data

Jun. 4, 1993 [JP] Japan .................. 5-158081

[51] Int. Cl.⁶ ............................................. B62D 5/04
[52] U.S. Cl. ......................... 364/424.05; 364/426.02; 180/79.1
[58] Field of Search ................... 364/424.05, 426.02; 180/140, 141, 142, 143, 197, 79.1; 280/91, 132

[56] References Cited

U.S. PATENT DOCUMENTS

| | | | |
|---|---|---|---|
| 4,830,127 | 5/1989 | Ito et al. | 180/79.1 |
| 4,909,343 | 3/1990 | Mouri et al. | 180/143 |
| 4,951,199 | 8/1990 | Whitehead | 364/424.05 |
| 4,966,249 | 10/1990 | Imaseki | 180/233 |
| 4,984,646 | 1/1991 | Sano et al. | 180/79.1 |
| 5,014,801 | 5/1991 | Hirose | 180/140 |
| 5,078,226 | 1/1992 | Inagaki et al. | 180/141 |
| 5,094,127 | 3/1992 | Ishida et al. | 74/866 |
| 5,097,917 | 3/1992 | Serizawa et al. | 180/79.1 |
| 5,151,860 | 9/1992 | Taniguchi et al. | 364/424.05 |
| 5,198,981 | 3/1993 | Collier-Hallman et al. | 364/424.05 |
| 5,225,984 | 7/1993 | Nakayama et al. | 364/424.05 |
| 5,236,335 | 8/1993 | Takeuchi et al. | 180/79.1 |
| 5,247,441 | 9/1993 | Serizawa et al. | 364/424.05 |
| 5,257,828 | 11/1993 | Miller et al. | 180/79.1 |

FOREIGN PATENT DOCUMENTS

| | | |
|---|---|---|
| 815080 | 6/1959 | United Kingdom . |
| 1411829 | 10/1975 | United Kingdom . |
| 2205541 | 12/1988 | United Kingdom . |

*Primary Examiner*—Kevin J. Teska
*Assistant Examiner*—Susan Wieland
*Attorney, Agent, or Firm*—Irving M. Weiner; Joseph P. Carrier; Pamela S. Burt

[57] ABSTRACT

In a powered vehicle steering system which produces a steering reaction for controlling the lateral movement of the vehicle, the steering reaction including a yaw rate reaction component and a steering wheel damping component, when the vehicle operator is firmly holding the steering wheel or actually turning the steering wheel, the damping component is reduced so that the effort required for turning the steering wheel may be reduced, and the vehicle operator may turn the steering wheel without any substantial effort. Conversely, if the vehicle operator is not firmly holding the steering wheel, and the steering wheel is allowed to move freely, the damping component is increased so that the lateral movement of the vehicle may be stabilized even when the vehicle is subjected to disturbances such as crosswind. Thus, the stability of the lateral movement of the vehicle and the responsiveness of the vehicle steering system can be ensured at the same time.

8 Claims, 7 Drawing Sheets

VEHICLE STEERING SYSTEM

TECHNICAL FIELD

The present invention relates to a vehicle steering system, and in particular to a vehicle steering system which can produce a steering torque that controls the vehicle behavior when the vehicle is subjected to an external disturbance such as crosswind.

BACKGROUND OF THE INVENTION

As a system for reducing the steering effort required by a vehicle operator, or a so-called power steering system, the type, for instance, disclosed in Japanese patent publication (kokoku) No. 50-33584 is known. According to this power steering system, the steering torque applied from a steering wheel is assisted by an output torque of an electric motor. By varying the gain for the detected signal corresponding to the steering torque applied to the steering wheel by a vehicle operator according to the vehicle speed and the road condition, the output torque of the assisting electric motor is adjusted so that an optimum steering torque may be obtained at all times.

When a vehicle encounters a strong crosswind or side wind, the vehicle tends to deviate from the intended straight path of travel. To maintain the vehicle on the straight path, it is necessary to apply a reaction to the steerable wheels which opposes such an external disturbance.

According to the conventional power steering system, however, the assisting torque is produced only when the vehicle operator has applied some steering torque to the steering wheel. Therefore, when the vehicle deviates from the intended straight path of travel due to crosswind, the electric motor will not produce any assisting torque by itself.

Therefore, to prevent the deviation of the vehicle from the intended path, the vehicle operator must constantly apply a manual steering torque to the steering wheel. According to the conventional steering system, the assisting torque is generally small when the lateral acceleration and the yaw rate of the vehicle are large. Therefore, when the vehicle deviates from an intended path of travel, the steering input necessary to restore the vehicle to the intended path of travel becomes progressively greater as the lateral acceleration and the yaw rate of the vehicle increase.

Thus, to overcome this inconvenience, it has been proposed to detect an irregular behavior of the vehicle caused by an external disturbance from the yaw rate or lateral acceleration of the vehicle, and to produce a reaction with an electric motor for producing a steering torque which cancels the effect of such a disturbance so that the irregular behavior of the vehicle due to external disturbances may be controlled.

According to such a control system using an electric motor, the steering output was given as a combination of a yaw rate reaction component for stabilizing the lateral movement of the vehicle and a damping component for stabilizing the movement of the steering wheel. The damping component for stabilizing the movement of the steering wheel was simply given as a product of a steering wheel angular speed and a constant damping coefficient.

However, for instance, when the yaw rate reaction coefficient is increased so as to ensure a sufficient control over the lateral movement of the vehicle in case of a strong crosswind, the damping coefficient for the movement of the steering wheel must be also increased so that the oscillatory movement of the steering wheel may be quickly attenuated. As a result, the vehicle operator will encounter a strong resistance when he tries to abruptly turn the steering wheel, and not only the vehicle operator experiences an unfamiliar feeling, but also the operability of the steering wheel is impaired. On the other hand, simply reducing the damping coefficient will reduce the rate of attenuation of the oscillatory angular movement of the steering wheel to an unacceptable level.

BRIEF SUMMARY OF THE INVENTION

The present invention was made in view of such problems of the previously proposed system, and its primary object is to provide a vehicle steering system which improves the resistance of the vehicle against the tendency of the vehicle to deviate from an intended straight path when the vehicle is subjected to an external disturbance such as crosswind, and yet preserves favorable handling of the vehicle steering system.

A second object of the present invention is to provide a vehicle steering system which can stabilize the lateral vehicle movement even when the vehicle is subjected to external disturbances such as crosswind, but can briskly respond to the steering input from the steering wheel.

A third object of the present invention is to provide a vehicle steering system which can stabilize the lateral vehicle movement even when the vehicle is subjected to external disturbances such as crosswind without the vehicle operator firmly holding the steering wheel.

These and other objects of the present invention can be accomplished by providing a vehicle steering system, comprising: power means for applying a steering torque to steerable wheels of a vehicle; power assist control means for detecting a steering torque input applied to a steering wheel by a vehicle operator, and producing a command to the power means to produce an assisting steering torque according to detected steering torque input; and reaction control means for producing a command to the power means to produce a steering wheel reaction in response to a turning maneuver of the vehicle, the steering wheel reaction comprising a damping component given as a mathematical function of an angular speed of the steering wheel and a reaction component given as a mathematical function of a dynamic variable of the vehicle such as a yaw rate and lateral acceleration; further comprising: restraint detecting means for detecting a restraint applied to the steering wheel by the vehicle operator; and the damping component of the steering wheel reaction being varied depending on an output from the restraint detecting means. Typically, the damping component of the steering wheel reaction is increased when detected restraint on the steering wheel is relatively small.

Thus, when the vehicle operator is firmly holding the steering wheel or actually turning the steering wheel, the damping component is reduced so that the effort required for turning the steering wheel may be reduced, and the vehicle operator may turn the steering wheel without any substantial effort. If the vehicle operator is not firmly holding the steering wheel, and the steering wheel is allowed to move freely, the damping component is increased so that the lateral movement of the vehicle may be stabilized even when the vehicle is subjected to disturbances such as crosswind.

The restraint applied to the steering wheel, or how firmly the vehicle operator is holding the steering wheel, may be detected directly by measuring the effort applied by the vehicle operator, but may be more conveniently detected by comparing a predicted steering torque computed from an equation of motion of a system including the steering wheel, with an actually detected steering torque.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
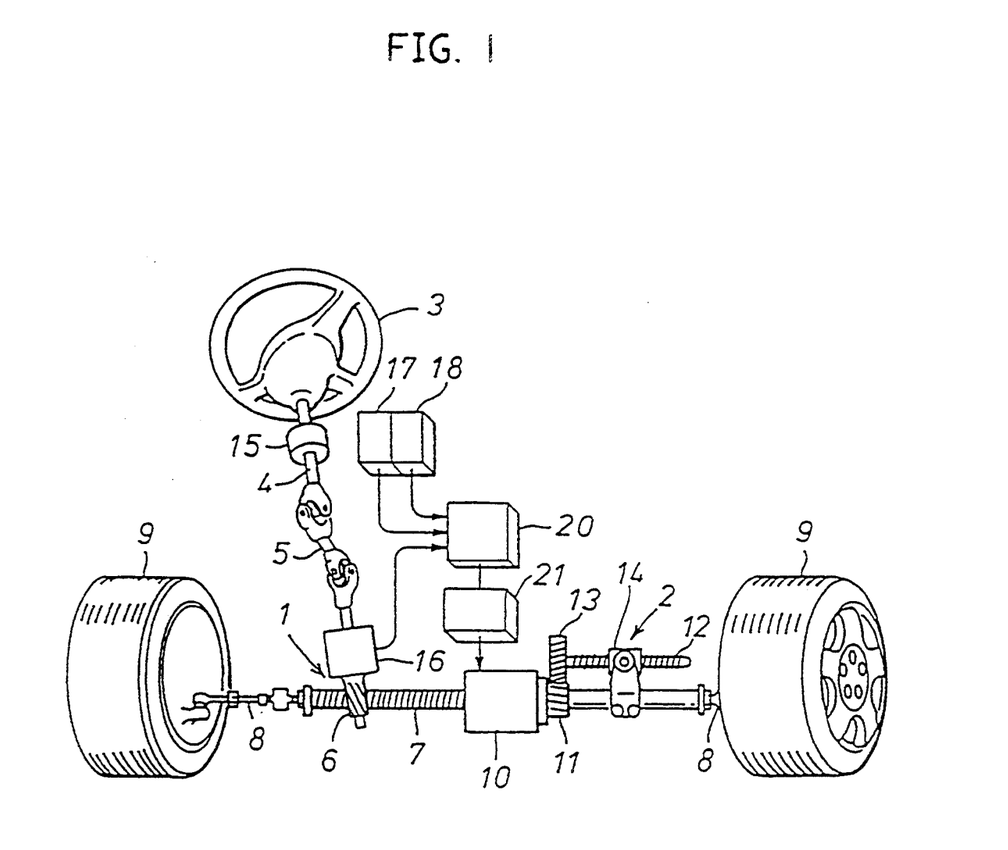
FIG. 1 is a schematic view of the overall structure of the vehicle steering system according to the present invention.

FIG. 1 shows the structure of a first embodiment of the vehicle steering system according to the present invention. This system comprises a manual steering device 1 and an electric power steering device 2. A steering shaft 4 integrally connected to a steering wheel 3 at its upper end is connected, via a connecting shaft 5 and associated universal joints, to a pinion 6 of a rack and pinion mechanism. A rack 7 meshing with the pinion 6 extends laterally and is adapted to move laterally in either direction, and its two ends are connected to knuckle arms of front wheels 9 via tie rods 8, respectively. Thus, the normal manual steering action can be accomplished by using this rack and pinion mechanism.

An electric motor 10 serving as torque generating means is coaxially disposed around the rack 7. The electric motor 10 is provided with a hollow rotor through which the rack 7 is passed, and a helical drive gear 11 is mounted on the rotor. The helical drive gear 11 meshes with a helical driven gear 13 attached to an axial end of a screw shaft 12 of a ball screw mechanism disposed in parallel with the rack 7. The nut 14 of the ball screw mechanism is fixedly secured to the rack 7.

The steering shaft 4 is provided with a steering angle sensor 15 for producing a signal corresponding to the rotational angle of the steering wheel 3, and a torque sensor 16 for producing a signal corresponding to the input steering torque of the steering shaft 4.

The vehicle body carries thereon a yaw rate sensor 17 for producing a signal corresponding to the yaw rate of the vehicle, and a vehicle speed sensor 18 for producing a signal corresponding to the travelling speed of the vehicle.

In this embodiment, the steering wheel 3 and the steerable wheels or the front wheels 9 are mechanically coupled, and the output torque of the electric motor 10 is controlled by feeding a control signal obtained by a control unit 20 according to the outputs from the sensors 15 through 18 to the electric motor 10 via a drive circuit 21.

Figure 2:
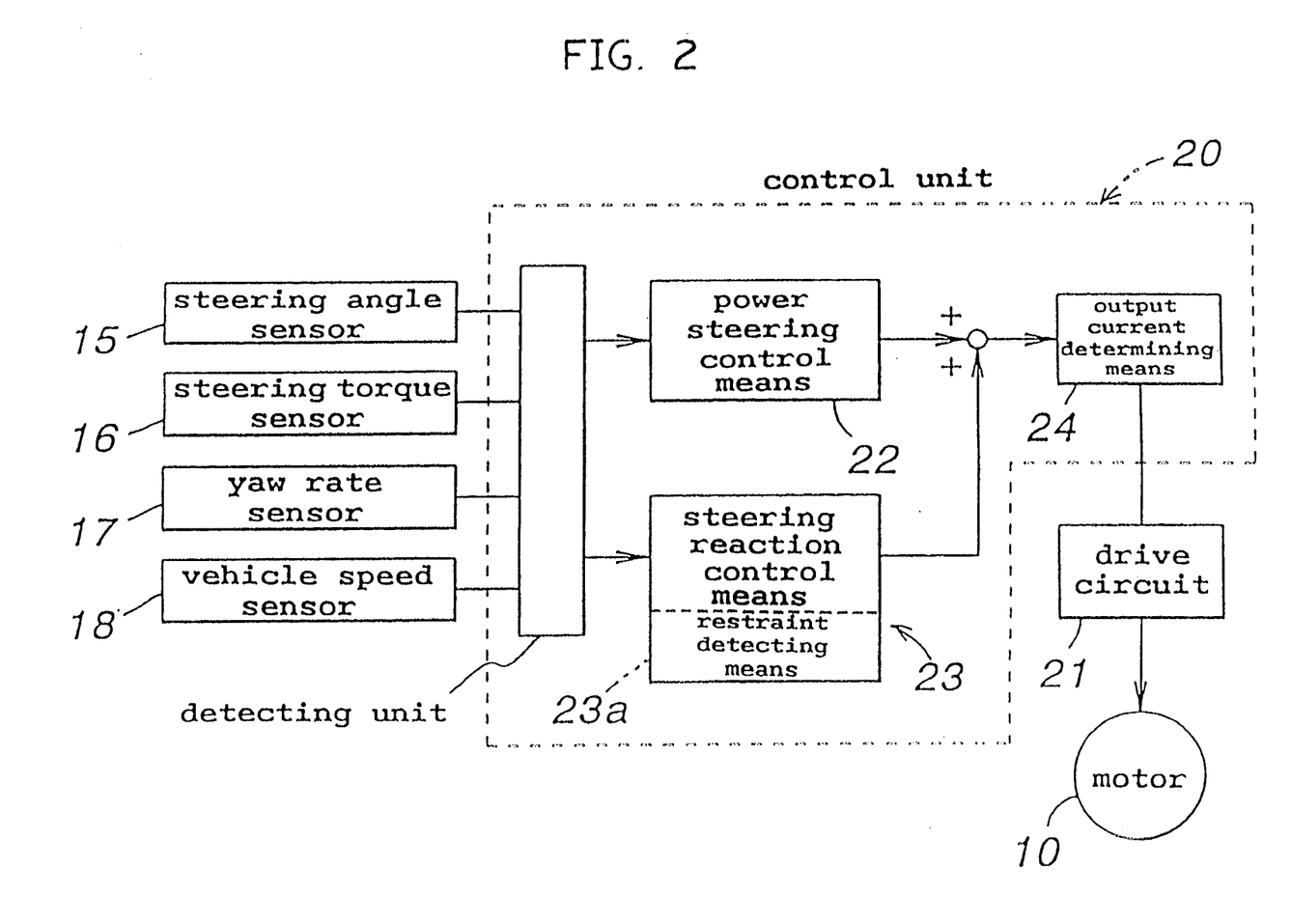
FIG. 2 is a circuit block diagram showing the structure of the control system for the steering system.

FIG. 2 is a block diagram of the control system for the vehicle steering system according to the present invention. The control unit 20 receives the output signals from the steering angle sensor 15, the steering torque sensor 16, the yaw rate sensor 17, and the vehicle speed sensor 18. These signals are supplied to electric power steering control means 22 and active steering reaction computing means 23, and, according to the output signals from these means, output current determining means 24 determines a target current which is to be supplied to the electric motor 10.

The electric power steering control means 22 carries out the normal control action for assisting the manual steering input. This control means 22 determines a target steering torque value according to the yaw rate according to the principle of the known electric power steering control, and detailed description thereof is omitted.

In the active steering reaction control means 23, a target steering reaction torque is determined by a prescribed algorithm according to the output signals from the sensors 15 through 18. The active steering reaction control means 23 is provided with steering wheel restraint condition detecting means 23a which detects the degree to which the vehicle operator is restraining the steering wheel, or, in other words, how firmly he is holding or turning the steering wheel according to a certain algorithm which takes into account the output signals from the sensors 15 through 18. More specifically, the steering wheel restraint condition detecting means 23a can detect if the vehicle operator is letting the steering wheel go free or firmly holding or turning the steering wheel.

In the output current determining means 24, a target drive current signal is obtained as a value substantially proportional but opposite in phase to the deviation of the actual torque value obtained from the torque sensor from the target torque value.

The target drive current value thus obtained is supplied to the drive circuit 21. The drive circuit 21 controls the electric motor 10, for instance, by PWM control, and the actual electric current supplied to the electric motor 10 is detected by a current sensor and fed back to the input of the drive circuit 21 for comparing it with the target drive current value.

Figure 3:
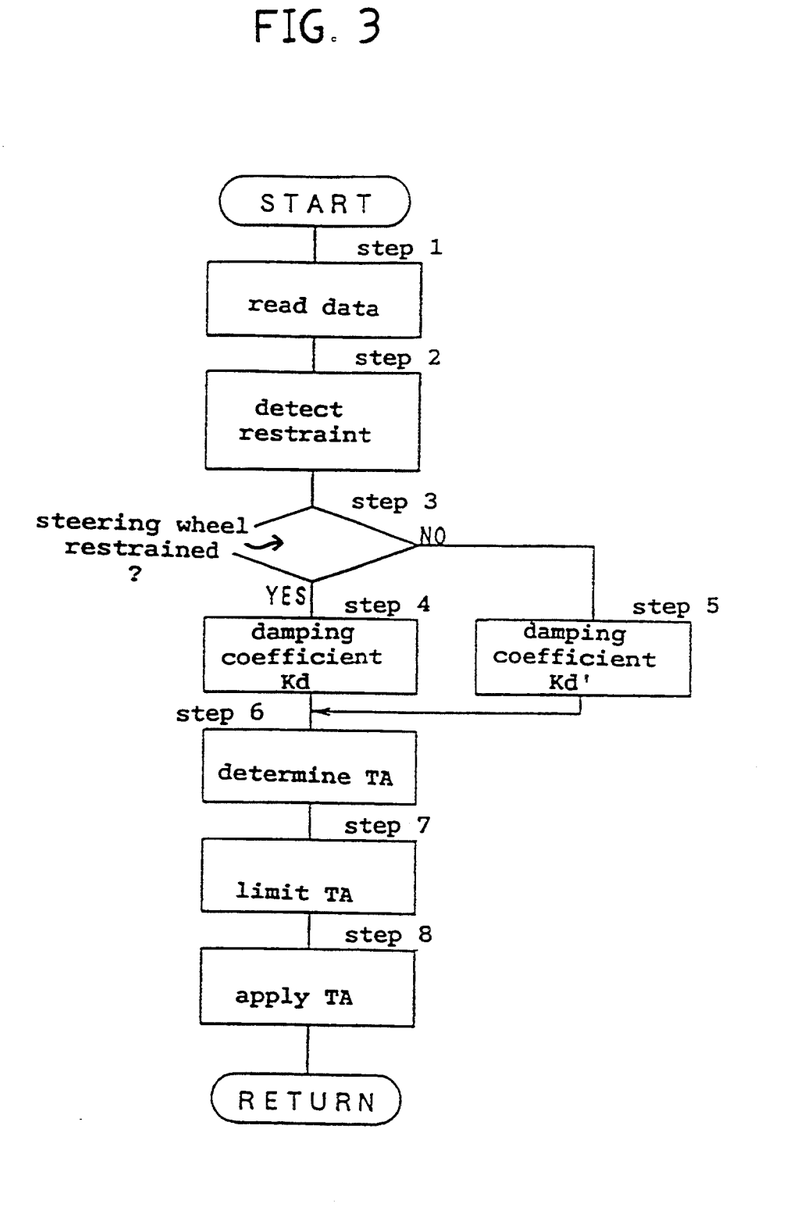
FIGS. 3 through 6 are flow charts showing the control process for the steering system.

In the active steering reaction computing means 23 of the control unit 20, the process shown in the flow chart of FIG. 3 is executed at a prescribed interval. First of all, the signals from the various sensors are read and the steering angular speed and the yaw rate deviation are computed in step 1. The extent to which the steering wheel is restrained by the vehicle operator is detected in step 2, and if the steering wheel is found to be being restrained by the vehicle operator or, in other words, the vehicle operator is found to be turning or firmly holding the steering wheel in step 3 the program flow advances to step 4 to select the smaller damping coefficient Kd which is used for computing the damping component of the target steering reaction TA in step 6. If the vehicle operator is found to be not firmly holding the steering wheel or letting the steering wheel go free in step 3, the program flow advances to step 5 to select the larger damping coefficient Kd' which is used for computing the damping component of the target steering reaction TA in step 6. A limit is imposed on the target steering reaction TA in step 7. This control signal is then added to the output from the electric power steering control means 22 in step 8.

Figure 4:
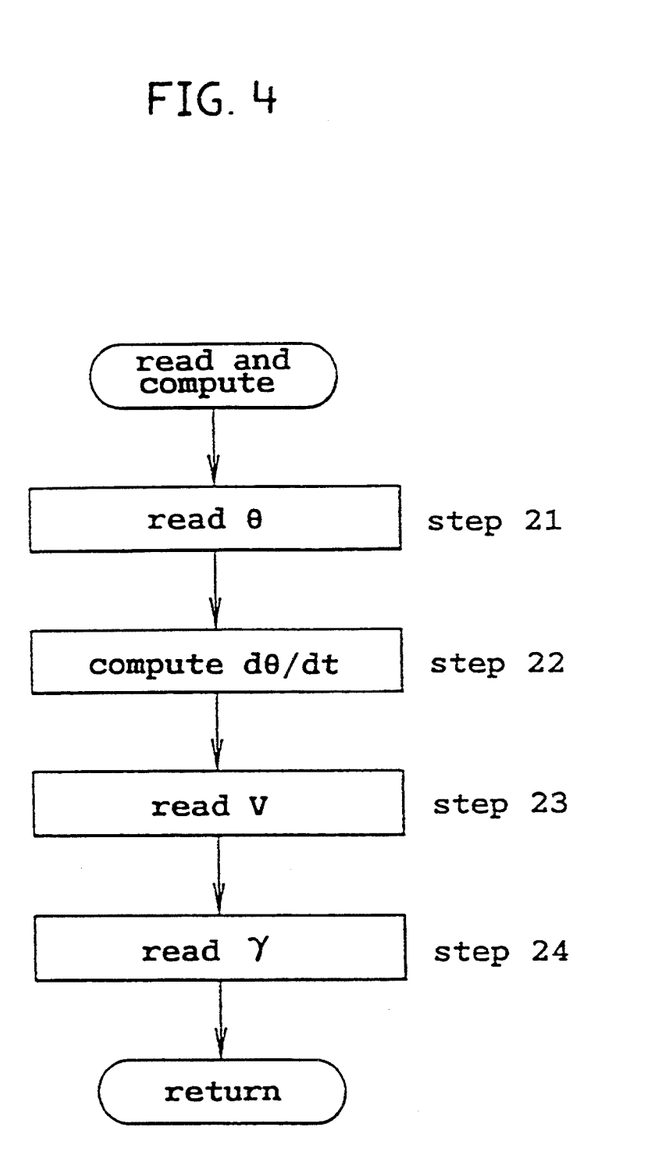
Figure 5:
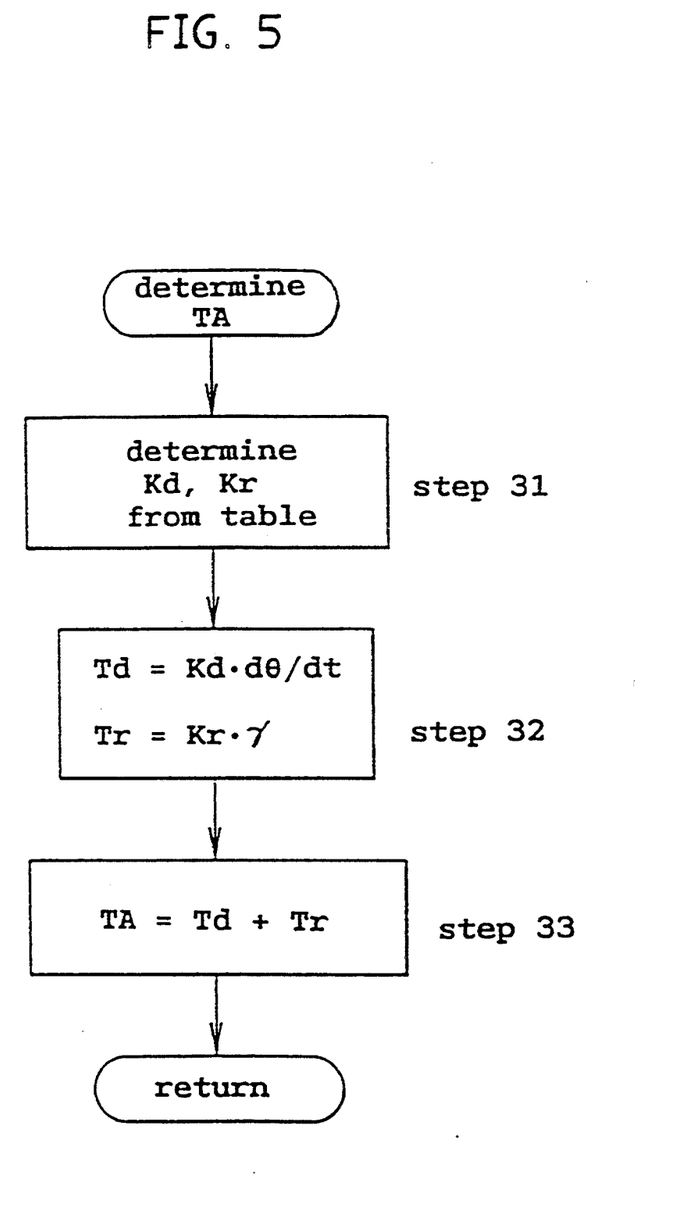
Figure 6:
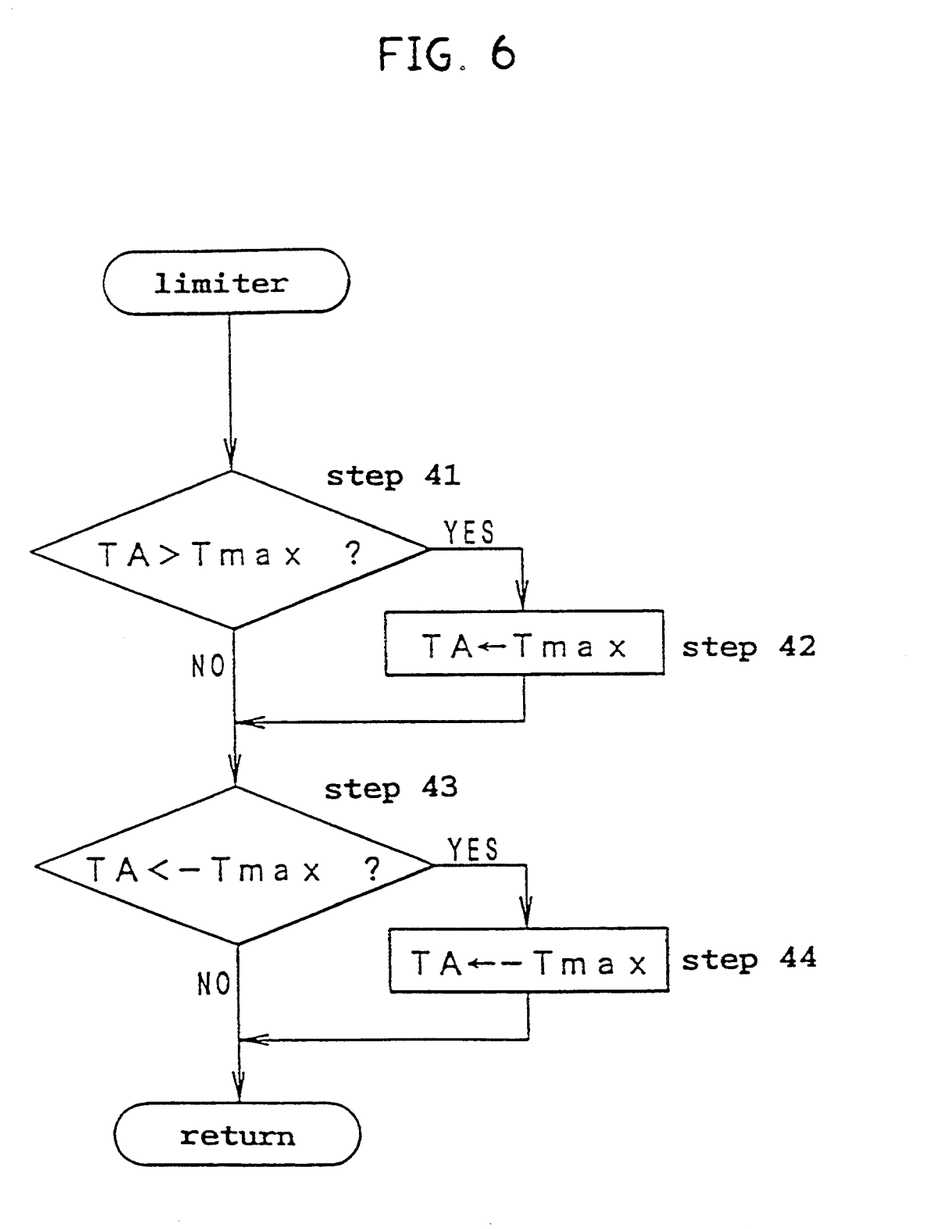

The processes carried out in steps 1, 2, 6 and 7 are described in greater detail with reference to FIGS. 4 through 6 as well.

In step 1, the following sub steps are carried out. First of all, the steering angle $\theta$ is read (step 21 of FIG. 4), and this signal is differentiated with time to compute the steering angular speed $d\theta/dt$ (step 22). Then, the vehicle speed V and the yaw rate $\gamma$ are read (steps 23 and 24).

In step 2, the degree of restraint on the steering wheel by the vehicle operator is computed by the following equations.

The equation of motion of the steering wheel and its related parts is given by $$T_S = J_H \cdot \left(\frac{d}{dt}\right)\omega + T_H \tag{1}$$

This equation is integrated with respect to time.

$$\int T_S dt = J_H \cdot \omega + \int T_H dt \tag{2}$$

This can be written as $$\frac{1}{J_H} \int T_S dt - \omega = \int T_H dt \tag{3}$$

where Ts (kg.cm) is a torque sensor output value, $T_H$ (kg.cm) is a steering or holding torque applied to the steering wheel, $\omega$ (deg.sec) is a steering wheel angular speed, and $J_H$ (kg.m) is the moment of inertia of the steering wheel.

By actually measuring Ts and $\omega$, $T_H$ can be computed. In other words, if the right hand side of Equation (3) is zero, it means that the vehicle operator is substantially releasing the steering wheel, and, otherwise, it means that the vehicle operator is firmly holding or steering the steering wheel.

In reality, the computation of Equation (3) is carried out from $t=0$ to $t=X$.

$$\frac{1}{J_H} \int_O^X T_S dt - \omega_X \tag{4}$$

where $\omega_X$ is the steering wheel angular speed at time X.

Since the integration from $t=0$ will be affected by an offset, the first term of Equation (4) is split at $t=X-N$ to obtain $$\frac{1}{J_H} \int_O^X T_S dt - \omega_X = \frac{1}{J_H} \int_O^{X-N} T_S dt + \frac{1}{J_H} \int_{X-N}^X T_S dt \tag{5}$$

By replacing the first term of Equation (5) with the steering wheel angular speed $\omega_{X-N}$ at time $X-N$, one obtains $$\frac{1}{J_H} \int_O^X T_S dt - \omega_X = \omega_{X-N} + \frac{1}{J_H} \int_{X-N}^X T_S dt \tag{6}$$

Thus, $T_H$ can be obtained by integrating this equation from $t=X-N$ to $t=X$. In step 3, it is determined if the vehicle operator is firmly holding or turning the steering wheel or substantially releasing the steering wheel depending on if $T_H$ is substantially zero or not.

Figure 7A:
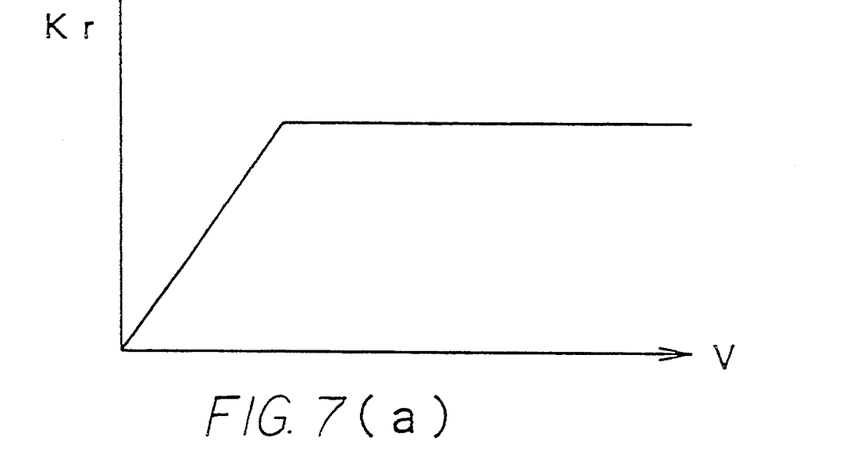
FIG. 7(a) and 7(b) are data tables used in the control process.
Figure 7B:
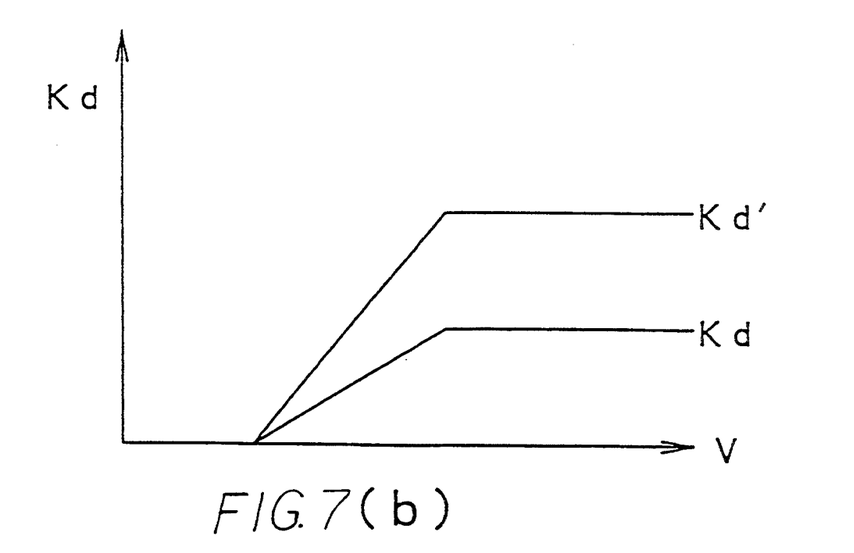

In step 6, a yaw rate reaction coefficient Kr and a damping reaction coefficient Kd (or Kd') are obtained from data tables as shown in FIG. 7 using the vehicle speed V as their address (step 31 of FIG. 5), and the steering reactions Tr and Td from these components are respectively computed (step 32). Then, the two components of the steering reaction Tr and Td are added to each other to determine the target steering reaction TA (step 33).

Referring to FIG. 7(a), the yaw rate reaction coefficient Kr is set to zero when the vehicle speed is zero so that no reaction may be generated when the vehicle is stationary or at an extremely low speed (for instance when the vehicle is being turned by a turntable of a parking garage).

Referring to FIG. 7(b), if the steering wheel is substantially unrestrained or free, the damping coefficient Kd' is increased, and the oscillation of the steering wheel is allowed to die down quickly. Conversely, if the steering wheel is being steered, the damping coefficient Kd is reduced so that the effort required for turning the steering wheel may be reduced, and the vehicle operator may easily turn the steering wheel. When the vehicle is stationary or is travelling at an extremely low speed, the damping coefficient is reduced to zero so that the steering wheel may be turned without much effort, and the steering wheel may be capable of returning to the neutral position by itself when the vehicle has made a turn, and the steering wheel is substantially released.

$$Tr = Kr \cdot \gamma$$

$$Td = Kd \cdot \theta \tag{7}$$

In step 7, it is determined if the target steering reaction TA exceeds a prescribed value (Tmax) or not (step 41 of FIG. 6), and if the target steering reaction TA exceeds the prescribed value, the target steering reaction TA is set at Tmax (step 42). If the target steering reaction TA is less than the prescribed value (Tmax), it is similarly determined if the target steering reaction TA falls below a prescribed value ($-$Tmax) or not (step 43), and if the target steering reaction TA is less (larger in the absolute value) than the prescribed value, the target steering reaction TA is set at $-$Tmax (step 44).

The thus determined target steering reaction TA is added to the target assisting steering torque computed separately, and is converted into a target current value by the output current determining means 24 which is then supplied to the drive circuit 21.

In this manner, when the vehicle is subjected to a crosswind when travelling a straight ahead course, and has started to deviate from the straight ahead course, the electric motor is driven in the direction to cancel the yaw rate $\gamma$ of the vehicle or to restore the vehicle back on the straight ahead course.

In the above described embodiment, the damping coefficient was selected depending on whether the vehicle operator is firmly holding the steering wheel, turning the steering wheel or letting the steering wheel go free, but it is also possible to use a map control based on a map giving a number of damping coefficients according to $T_H$.

Thus, according to the present invention, when the vehicle operator is firmly holding the steering wheel, he is likely to quickly turn the steering wheel, and the damping coefficient is therefore reduced so that a brisk steering action may be made possible. On the other hand, when the vehicle operator is not firmly holding the steering wheel, a quick steering action is not likely, and a desired stability can be ensured by increasing the damping coefficient for the steering wheel so that the lateral movement of the vehicle may be stabilized even when the vehicle is subjected to disturbances such as strong crosswind. Thus, the stability of the lateral movement of the vehicle and the responsiveness of the vehicle steering system can be ensured at the same time.

Although the present invention has been described in terms of specific embodiments thereof, it is possible to modify and alter details thereof without departing from the spirit of the present invention.

What we claimed is:

1. A vehicle steering system, comprising:
   power means for applying a steering torque to steerable wheels of a vehicle;
   power assist control means for detecting a steering torque input applied to a steering wheel by a vehicle operator, and producing a command to said power means to produce an assisting steering torque according to detected steering torque input;
   reaction control means for producing a command to said power means to produce a steering wheel reaction in response to a turning maneuver of said vehicle, said steering wheel reaction comprising a damping component given as a mathematical function of an angular speed of said steering wheel;
   restraint detecting means for detecting a restraint applied to said steering wheel by said vehicle operator; and
   said reaction control means varies said damping component of said steering wheel reaction depending on an output from said restraint detecting means.

2. A vehicle steering system according to claim 1, wherein said reaction control means increases said damping component of said steering wheel reaction when detected restraint on said steering wheel is relatively small.

3. A vehicle steering system according to claim 2, wherein said reaction control means increases said damping component of said steering wheel reaction when detected restraint on the steering wheel is approximately zero.

4. A vehicle steering system according to claim 1, wherein said steering wheel reaction comprises a yaw rate reaction component, in addition to said damping component, which is given as a mathematical function of a yaw rate of said vehicle.

5. A vehicle steering system according to claim 1, wherein said steering wheel reaction comprises a lateral acceleration reaction component, in addition to said damping component, which is given as a mathematical function of a lateral acceleration of said vehicle.

6. A vehicle steering system according to claim 1, wherein said system includes means for detecting vehicle speed, and said reaction control means also varies said damping component of said steering wheel reaction depending on an output from said vehicle speed detecting means.

7. A vehicle steering system according to claim 1, wherein said restraint detecting means detects restraint applied to said steering wheel by comparing a predicted steering torque computed from an equation of motion of a vehicle steering system including said steering wheel, with an actually detected steering torque.

8. A vehicle steering system according to claim 7, wherein said restraint detecting means computes the predicted steering torque from the equation of motion based on a detected steering wheel angular speed.

* * * * *

UNITED STATES PATENT AND TRADEMARK OFFICE
CERTIFICATE OF CORRECTION

PATENT NO. : 5,448,482
DATED : 05 September 1995
INVENTOR(S) : Yorihisa Yamamoto, Yutaka Nishi, Takashi Nishimori, Hiroyuki Tokunaga It is certified that error appears in the above-indentified patent and that said Letters Patent is hereby corrected as shown below:

Column 7, line 10, change "claimed" to --claim--.

Signed and Sealed this

Seventh Day of November, 1995

Attest:

BRUCE LEHMAN

*Attesting Officer*      *Commissioner of Patents and Trademarks*